(12) United States Patent
Lee

(10) Patent No.: US 8,845,254 B2
(45) Date of Patent: Sep. 30, 2014

(54) SELF-LOCKING BOLT NUT ASSEMBLY

(76) Inventor: Sang Cheol Lee, Goyang Si (KR)

(*) Notice: Subject to any disclaimer, the term of this patent is extended or adjusted under 35 U.S.C. 154(b) by 157 days.

(21) Appl. No.: 13/129,826

(22) PCT Filed: Dec. 7, 2009

(86) PCT No.: PCT/KR2009/007281
§ 371 (c)(1),
(2), (4) Date: Jun. 27, 2011

(87) PCT Pub. No.: WO2010/068001
PCT Pub. Date: Jun. 17, 2010

(65) Prior Publication Data
US 2011/0274514 A1 Nov. 10, 2011

(30) Foreign Application Priority Data

Dec. 9, 2008 (KR) .......................... 10-2008-0124598
Nov. 30, 2009 (KR) .......................... 10-2009-0116950

(51) Int. Cl.
*F16B 39/32* (2006.01)
*F16B 39/24* (2006.01)
*F16B 39/282* (2006.01)
*F16B 43/00* (2006.01)
*F16B 35/04* (2006.01)

(52) U.S. Cl.
CPC ................. *F16B 39/24* (2013.01); *F16B 39/32* (2013.01); *Y10S 411/953* (2013.01); *F16B 35/041* (2013.01); *F16B 39/282* (2013.01); *F16B 43/00* (2013.01)

USPC ............ 411/331; 411/145; 411/165; 411/953

(58) Field of Classification Search
CPC ....... F16B 39/24; F16B 39/22; Y10S 411/953
USPC ......... 411/325, 330, 331, 138, 145, 163, 165, 411/953, 949
See application file for complete search history.

(56) References Cited

U.S. PATENT DOCUMENTS

| 523,878 | A | * | 7/1894 | Bickell | 411/326 |
|---|---|---|---|---|---|
| 612,490 | A | * | 10/1898 | Durbin | 411/331 |
| 655,054 | A | * | 7/1900 | Burleson | 411/331 |
| 667,361 | A | * | 2/1901 | Burleson | 411/331 |
| 718,336 | A | * | 1/1903 | Freund | 411/228 |
| 819,947 | A | * | 5/1906 | Strack | 411/136 |
| 904,606 | A | * | 11/1908 | Dressler | 411/133 |
| 1,013,866 | A | * | 1/1912 | De Haven | 411/331 |
| 1,033,581 | A | * | 7/1912 | Hanchett et al. | 411/331 |

(Continued)

*Primary Examiner* — Flemming Saether
(74) *Attorney, Agent, or Firm* — Lexyoume IP Meister, PLLC

(57) ABSTRACT

The present invention relates to a self-locking bolt-nut assembly including a bolt; a nut tightened on the bolt; and a washer provided between the bolt and the nut, wherein the nut has a counterbore being formed in the nut, and has a plurality of stop protrusions formed on the inner surface of the circumferential sidewall of the counterbored portion of the nut, the stop protrusions being arranged in a circumferential direction at regular intervals, the washer including the rotation-preventive protrusion protruded on inner circumference of the washer towards the center thereof, the rotation-preventive protrusion being inserted into the insertion guide groove; and a plurality of elastic protrusions which is protruded on outer circumference of the washer, being inclined in the direction where the nut is turned to tighten it.

7 Claims, 7 Drawing Sheets

(56) References Cited

U.S. PATENT DOCUMENTS

| | | | |
|---|---|---|---|
| 1,382,524 A * | 6/1921 | MacKintosh et al. | 411/331 |
| 1,813,640 A * | 7/1931 | Rossetti | 411/330 |
| 3,385,341 A * | 5/1968 | Garstkiewicz | 411/134 |
| 3,540,509 A * | 11/1970 | Gutshall | 411/145 |
| 4,055,208 A * | 10/1977 | Blaul | 411/134 |
| 4,383,787 A * | 5/1983 | Reynolds | 411/221 |
| 4,863,328 A * | 9/1989 | Malek | 411/114 |
| 6,036,236 A * | 3/2000 | Bensel | 285/89 |

\* cited by examiner

SELF-LOCKING BOLT NUT ASSEMBLY

BACKGROUND OF THE INVENTION (a) Field of the Invention

The present invention relates to a bolt-nut assembly which includes a bolt, a nut and a washer and has a self-locking function that prevents the nut from becoming loose from the bolt.

(b) Description of the Related Art

Typically, bolt-nut assemblies are widely used, in which a bolt is inserted through elements and a nut is then tightened on the bolt to fasten the elements to each other, in order to couple construction materials or mechanical elements to each other.

However, with the passage of time, such bolt-nut assemblies may gradually become loose because of external vibrations or shocks, thus deteriorating the reliability of the coupling portion.

In an effort to prevent a nut from becoming loose by reverse rotation of the nut, a variety of auxiliary fastening means have been proposed. A representative example of the auxiliary fastening means was disclosed in Korean Utility Model Registration No. 0241791 (entitled "Bolt with safe-locking nut").

In Korean Utility Model Registration No. 0241791, as shown in FIG. 1, a locking groove 1-3 is formed in a threaded portion of a bolt body 1. A stopper 2-2 provided on a washer is locked into the locking groove 1-3. One-way stop protrusions 2-3 and 3-3 are respectively provided on the washer 2 and a nut 3 on the junction between the washer 2 and the nut 3.

This conventional technique has, however, the following problems.

1) The nut 3 and the washer 2 interact with each other in such a way that the washer 2 and the nut 3 pass over each other with compression strain therebetween rather than having the washer 2 elastically bend with respect to the nut 3 and then return to its original state. Thus, if the washer is made of a hard material, the one-way stop protrusions 3-2 of the nut 3 may not be able to pass over the one-way stop protrusions 2-3 of the washer 2.

Meanwhile, if the washer is made of soft material (for example, rubber, plastic, etc.), it cannot withstand a high bolt coupling torque and compression force. Furthermore, it cannot withstand a severe environment, for example, high-temperature and high-pressure environment, for a long period of time. Hence, the conventional bolt-nut structure cannot be used in a fastening element for a structure or power apparatus which is exposed to vibrations, shocks, high temperature conditions, etc.

Particularly, in the case where the washer is made of soft material, when the nut is tightened, a surface of the washer that comes into contact with the nut is compressed by the nut in the same shape (hexagonal shape) as that of the nut. The compressed surface of the washer functions to resist the force that would act to loosen the nut. Thus, the one-way stop protrusions 2-3 and 3-3 which are formed on the washer 2 and the nut 3 become useless.

2) If the nut 3 is forcibly tightened onto the bolt body 1, the one-way stop protrusions 2-3 and 3-3 which are formed on the washer 2 and the nut 3 may be worn or damaged (broken), thus malfunctioning.

3) Even if the nut 3 has been forcibly tightened on the bolt body 1, the one-way stop protrusions 2-3 and 3-2 of the washer 2 and the nut 3 are not completely brought into contact with each other or do not reliably lock into each other, thus causing the fastening to be unsatisfactory.

4) Therefore, after the nut 3 has been tightened onto the bolt body 1, the nut 3 is easily loosened despite comparatively low vibration, thereby making it difficult to keep a prescribed torque.

5) Furthermore, when tightening the nut 3 on the bolt body 1, compression force between the one-way stop protrusions 2-3 and 3-2 of the washer 2 and the nut 3 largely varies while the one-way stop protrusions 2-3 and 3-2 pass over each other. Thereby the tightening torque cannot be maintained constant. That is, during the operation of tightening the nut 3 on the bolt body 1, the following processes are repeated; while the one-way stop protrusions 3-2 of the nut 3 slide along the one-way stop protrusions 2-3 of the washer 2, the tightening torque gradually increases and then reaches a peak, and the moment after the one-way stop protrusions 3-2 completely pass over the one-way stop protrusions 2-3, the tightening torque is rapidly reduced. Hence, the tightening torque is not constant.

6) In addition, once the nut 3 has been tightened on the bolt body 1, it is impossible to separate the nut 3 from the bolt to reuse it, thus wasting material. The reason for this is that if the nut 3 is forcibly turned in the direction in which it is loosened, the one-way stop protrusions 2-3 and 3-2 of the washer 2 and the nut 3 which have engaged with each other are damaged or broken (at least the edges thereof are severely worn so that they cannot be reused).

7) When washers are manufactured, the amount of material required to form each washer is increased, and the shape of the washer is complex. Thus, the production cost per unit is markedly increased.

8) The one-way stop protrusions 2-3 and 3-2 may be worn or damaged for various reasons, thus causing the nut 3 to become loose. After this, there is no longer any means for preventing the nut from becoming loose.

SUMMARY OF THE INVENTION

Accordingly, the present invention has been made keeping in mind the above problems occurring in the prior art, and objects of the present invention are as follows.

First, an object of the present invention is to provide a self-locking bolt-nut assembly in which a nut can be more smoothly tightened with elastic force of a washer, and after the tightening has been accomplished, the washer which is biased to return to its original state is elastically locked to the nut, so that the nut is prevented from becoming loose by vibrations or external force.

Second, another object of the present invention is to provide a self-locking bolt-nut assembly in which even if the nut is slightly loosened or is partially damaged after the tightening has been accomplished, the washer which has been in contact with the nut can reliably continuously exhibit the self-locking function.

Third, a further object of the present invention is to provide a self-locking bolt-nut assembly in which when a user rotates the nut to intentionally loosen the nut, the washer which is made of a thin plate is more easily broken than other elements, thus allowing the nut to be loosened, and the nut can be tightened to the bolt again with the self-locking function by replacing only the washer which is expendable with a new one.

Fourth, yet another object of the present invention is to provide a self-locking bolt-nut assembly which provides a means which can more precisely control and uniformly maintain the torque with which the nut is tightened.

In order to accomplish the above object, the present invention provides a self-locking bolt-nut assembly, including: a bolt (100a, 100b); a nut (200a, 200b) tightened on the bolt (100a, 100b); and a washer (300a, 300b) provided between the bolt (100a, 100b) and the nut (200a, 200b), wherein the bolt (100a, 100b) comprises a bolt head (110a, 110b) and a bolt body (120a, 120b), the bolt body (120a, 120b) having an external thread thereon, with an insertion guide groove (130a, 130b) formed in the bolt body (120a, 120b) along a longitudinal direction of the bolt body (120a, 120b), the nut (200a, 200b) has a plurality of stop protrusions (210a, 210b) provided on a surface of the nut (200a, 200b) that comes into contact with the washer (300a, 300b), the stop protrusions (210a, 210b) being arranged in a circumferential direction at regular intervals, and the washer (300a, 300b) comprises: a rotation-preventive protrusion (310a, 310b) protruding from a circumferential inner edge of the washer (300a, 300b) towards a center thereof, the rotation-preventive protrusion (310a, 310b) being inserted into the insertion guide groove (130a, 130b); and a plurality of elastic protrusions (320a, 320b) provided on a surface of the washer (300a, 300b) that comes into contact with the nut (200a, 200b), the elastic protrusions (320a, 320b) being arranged in a circumferential direction at regular intervals, whereby when the nut (200a, 200b) which has been in contact with the washer (300a, 300b) is tightened, the elastic protrusions (320a, 320b) are elastically bent while passing over first surfaces of corresponding stop protrusions (210a, 210b), and then are returned to original states thereof by elastic force so that elastic protrusions (320a, 320b) are locked to second surfaces of the stop protrusions (210a, 210b).

BRIEF DESCRIPTION OF THE DRAWINGS

FIG. 2a illustrates the case where elastic protrusions (320a) are provided around a circumferential outer edge of a washer (300a); and FIG. 2b illustrates the case where elastic protrusions (320b) are provided around a circumferential inner edge of a washer (300b);

FIG. 3a illustrates the cases where elastic protrusions (320a) are provided around the circumferential outer edge of the washer (300a, 300c); FIG. 3b illustrates the case where elastic protrusions (320b, 320d) are provided around the circumferential inner edge of the washer (300b, 300d); and FIG. 3c illustrates the case where elastic protrusions are provided between the circumferential inner and outer edges of the washer (300e, 300f);

Figure 1:
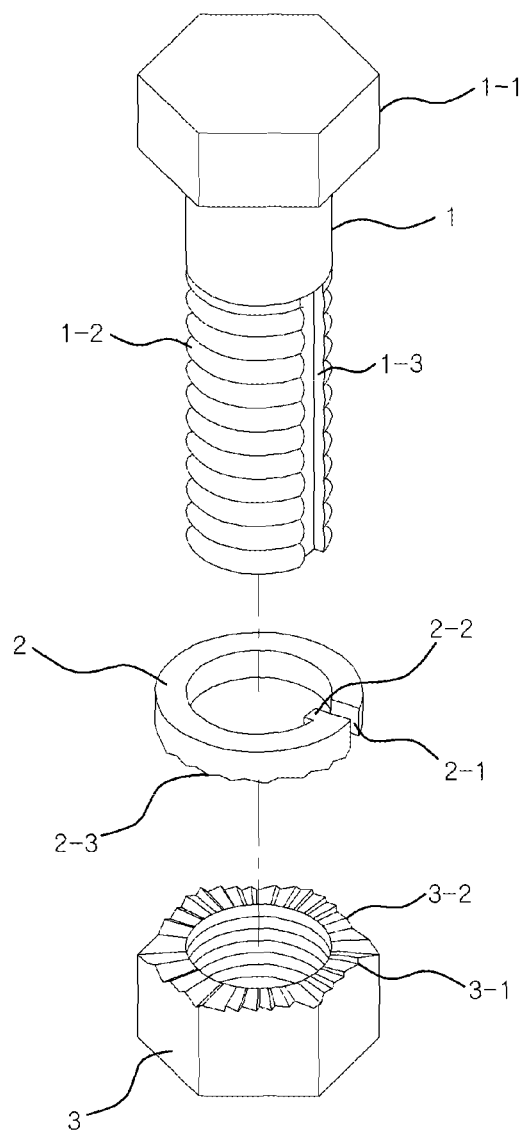
FIG. 1 is a perspective view showing the structure of a conventional technique.

DESCRIPTION OF THE ELEMENTS IN THE DRAWINGS 100a, 100b: bolt
110a, 110b: bolt head
120a, 120b: bolt body
130a, 130b: insertion guide groove
200a, 200b, 200c, 200d: nut 210a, 210b, 210c, 210d: stop protrusion
211a, 211b, 211c, 211d: ramp
212a, 212b, 212d: stop surface
213b, 213d: horizontal surface
300a, 300b, 300c, 300d, 300e, 300f, 300g, 530, 600a, 600b, 600c: washer
310a, 310b, 310c, 310d, 310e, 310f, 310gc 510: rotation-preventive protrusion
320a, 320b, 320d, 520, 620a, 620c: elastic protrusion
321e, 321f, 321g, 620b: ramp piece

DETAILED DESCRIPTION OF THE EMBODIMENTS

Hereinafter, preferred embodiments of the present invention will be described in detail with reference to the accompanying drawings.

Figure 2:
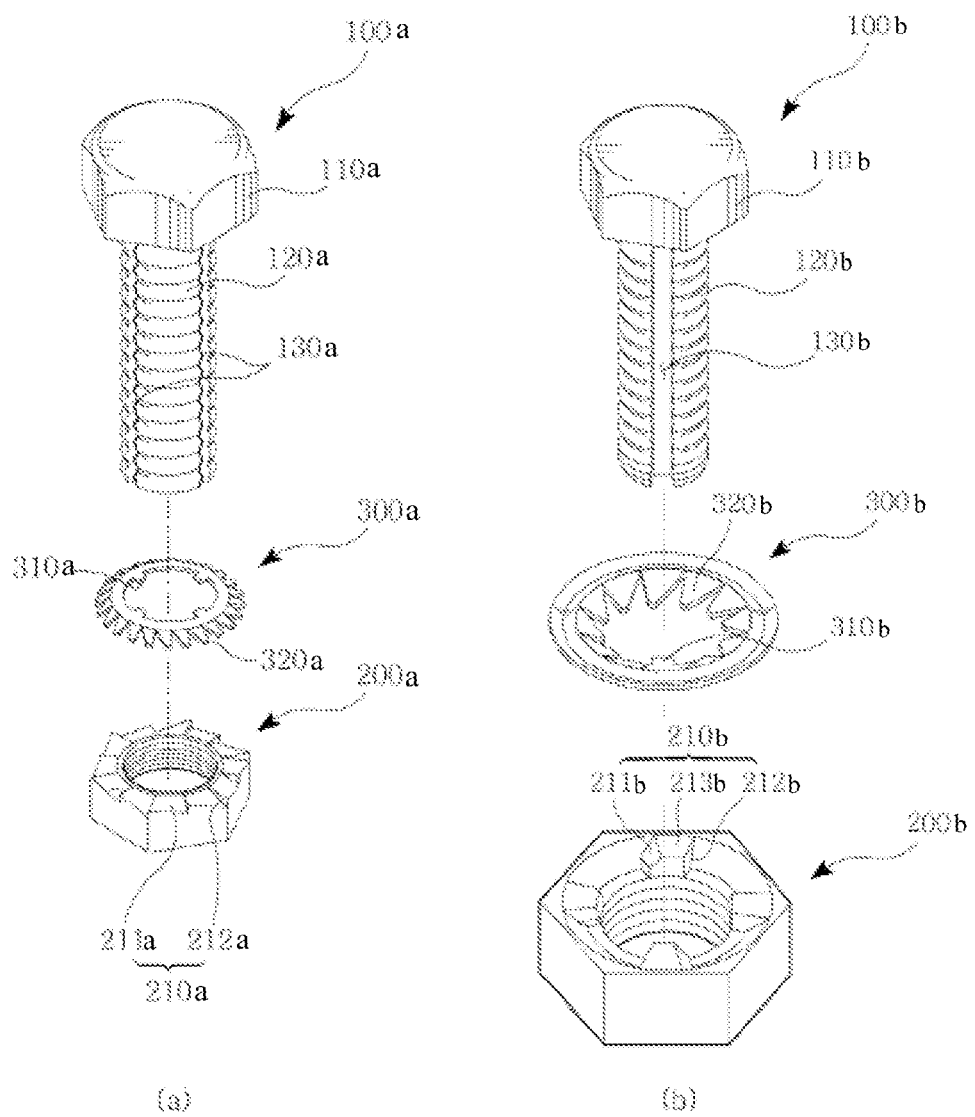
FIG. 2 is of perspective views showing a preferred embodiment of the present invention.

FIG. 2 is of perspective views showing a preferred embodiment of the present invention, in which FIG. 2a illustrates the case where elastic protrusions 320a are provided around a circumferential outer edge of a washer 300a, and FIG. 2b illustrates the case where elastic protrusions 320b are provided around a circumferential inner edge of a washer 300b.

The bolt 100a includes a bolt head 110a and a bolt body 120a. An external thread is formed around the bolt body 120a, and an insertion guide groove 130a is formed in the bolt body 120a along the longitudinal direction of the bolt body 120a. The insertion guide groove 130a may be single or, alternatively, it may comprise a plurality of insertion guide grooves 130a.

Figure 3:
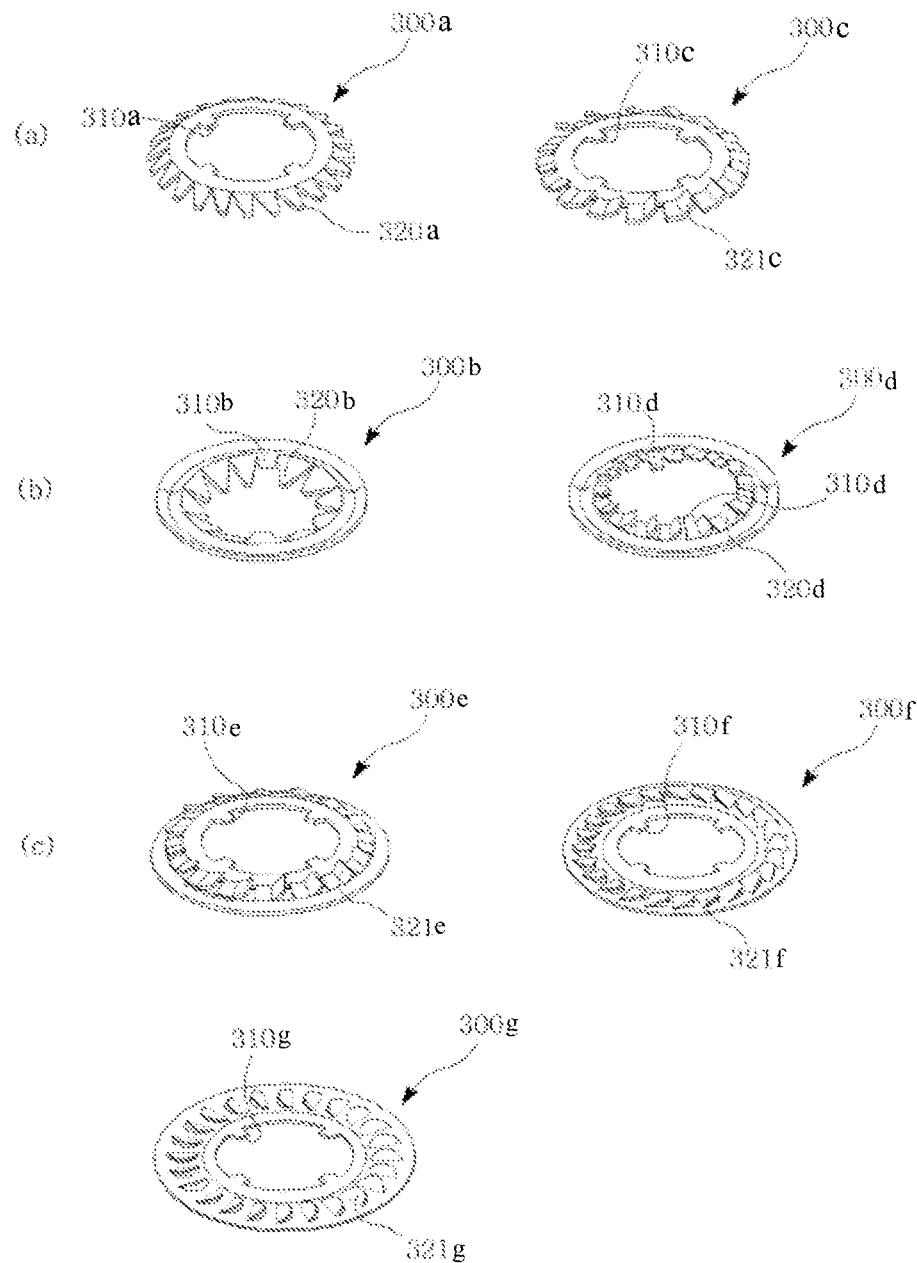
FIG. 3 shows embodiments of the washer (300a, 300b, 300c, 300d, 300e, 300f, 300g) of the present invention.
Figure 5:
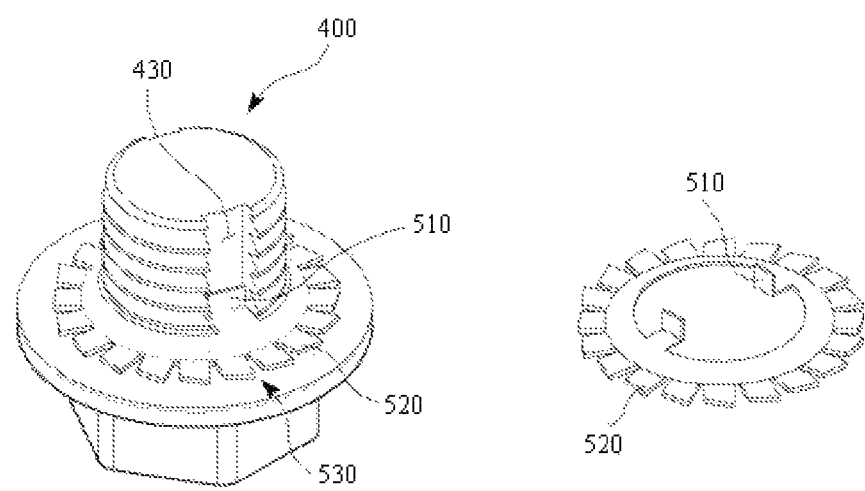
FIG. 5 is of perspective views showing the structure of a rotation-preventive protrusion (510) with a bent distal end according to the present invention.

The washer 300a includes a rotation-preventive protrusion 310a which protrudes from the circumferential inner edge of the washer 300a towards the center thereof and is inserted into the insertion guide groove 130a. As shown in FIG. 3, the rotation-preventive protrusion 310a, 310b, 310c, 310d, 310e, 310f, 310g may have a linear planar shape. Alternatively, as shown in FIG. 5, the rotation-preventive protrusion 510 may be configured in such a way that a distal end thereof is bent towards the nut 200a, 200b, 200c, 200d.

When the distal end of the rotation-preventive protrusion 310a, 310b, 310c, 310d, 310e, 310f, 310g has a bent shape, the insertion guide groove 130a, 130b is prevented from being removed from the insertion guide groove 130a, 130b and entering a valley portion of the thread of the bolt body 120a, 120b, so that the bolt 100a, 100b can be reliably tightened to the nut 200a, 200b, 200c, 200d and the operation of the tightening of the bolt 100a, 100b to the nut 200a, 200b, 200c, 200d can be further facilitated. Furthermore, as shown in FIG. 5, in the case where the rotation-preventive protrusion 510 is bent to have an "L"-shape, the insertion of the bolt 400 into the washer 530 can be further facilitated.

The washer 530 further includes a plurality of elastic protrusions 520 which are provided on a surface of the washer 530 that comes into contact with the nut and are arranged in a circumferential direction at regular intervals.

Each elastic protrusion 520 can be elastically bent and returned to its original state by the elastic force. When the nut which has been in contact with the washer 530 is tightened, the elastic protrusions 520 elastically bend while passing over first surfaces of corresponding stop protrusions, and then are returned to their original states by the elastic force so that elastic protrusions 520 are locked to second surfaces of the stop protrusions, thus effectively preventing the nut from becoming loose.

As shown in FIG. 3, the elastic protrusions 320a, 320b, 320d may have a variety of shapes.

FIG. 3a illustrates the cases where elastic protrusions 320a are provided around the circumferential outer edge of the washer 300a, 300c. FIG. 3b illustrates the cases where elastic protrusions 320b, 320d are provided around the circumferential inner edge of the washer 300b, 300d. FIG. 3c illustrates the cases where elastic protrusions are provided between the circumferential inner and outer edges of the washer 300e, 300f, 300g. There is no difference in special technical effect among these cases, and the only differences between the cases are the detailed locations and shapes of the elastic protrusions.

Therefore, the shapes of the elastic protrusions can be freely determined depending on the shapes of the stop protrusions of the nut.

In detail, FIG. 3a illustrates the case where the circumferential outer edge of the washer 300a, 300c is cut to have a saw-tooth shape and the saw-teeth of the washer 300a, 300c are bent towards the nut and the case where ramp pieces 321c that are inclined in the direction in which the nut is tightened are provided around the circumferential outer edge of the washer 300a, 300c.

The detailed shape of each saw-tooth or the bent shape thereof, and the gradient and shape of each ramp piece 321c are not limited to those shown in the accompanying drawing, and various modifications in design are possible.

FIG. 3b illustrates the case where the circumferential inner edge of the washer 300b, 300d is cut to have a saw-tooth shape and the saw-teeth of the washer 300b, 300d are bent towards the nut and the case where ramp pieces that are inclined in the direction in which the nut is tightened are provided around the circumferential inner edge of the washer 300b, 300d.

In the cases of FIG. 3b, in the same manner as the cases of FIG. 3a, the detailed shape of each saw-tooth or the bent shape thereof, and the gradient and shape of each ramp piece 321c are also not limited to those shown in the accompanying drawing, and various modifications in design are possible.

FIG. 3c illustrates the cases where the elastic protrusions are provided between the circumferential inner and outer edges of the washer 300e, 300f, 300g wherein ramp pieces 321e, 321f, 321g that are inclined in the direction in which the nut is tightened are provided on the washer 300e, 300f, 300g at positions spaced apart from each other at regular intervals and arranged in the circumferential direction.

In the cases of FIG. 3c, of course, the detailed shape of each saw-tooth or the bent shape thereof, and the gradient and shape of each ramp piece 321e, 321f, 321g are also not limited to those shown in the accompanying drawing, and various modifications in design are possible. Furthermore, the number of elastic protrusions and the intervals therebetween may be equal to those of the stop protrusions of the nut. More preferably, the number of elastic protrusions may be much greater than that of the stop protrusions.

The reason for this is that as the intervals between the elastic protrusions are reduced, the tightening torque with which the nut is tightened can be more precisely controlled. Thus, if it is required to further precisely control the tightening torque with which the nut is tightened, the elastic protrusions are preferably spaced apart by shorter intervals.

In addition, when the number of stop protrusions of the nut is N and the number of elastic protrusions of the washer 300e, 300f is M, if M and N are determined by the equation, M=n*N±1 (where n is a positive integer), the tightening torque can be more precisely and uniformly controlled. Furthermore, with respect to the function of resisting loosening of the nut, even if the nut is loosened only by an angle of 1 to 3 degrees, the following stop protrusions hold the corresponding elastic protrusions, so that the nut can be more reliably prevented from undesirably becoming loose.

For example, if the number of stop protrusions of the nut is 6, and n is 5, the number of elastic protrusions of the washer 300e, 300f becomes 29 or 31.

In this case, elastic protrusions of 5+⅚ or 6+⅙ are assigned to each stop protrusion of the nut. Thus, every time the nut is turned by an angle corresponding to the size of ⅙ of the single elastic protrusion, the stop protrusions are locked to the corresponding elastic protrusions. Because the elastic protrusion are arranged at intervals of 360°/29 (about 12°), every time the nut is turned by 12.4°/6 (about 2°), it can be locked.

If the number of elastic protrusions is an exact multiple of the number of stop protrusions rather than being based on the equation stated above, every time the nut is turned by an angle equal to an angular interval at which adjacent elastic protrusions are spaced apart from each other, it is locked. For example, if the number of elastic protrusions is 30 and the number of stop protrusions is 6, six elastic protrusions are assigned to each stop protrusion. Thus, the nut cannot enter the subsequent locked state until the nut is further turned by 360°/30 (12°). Therefore, the angle at which the nut must be turned to enter the locked state is markedly increased.

In other words, although the intervals at which the elastic protrusions 320 are spaced apart from each other are similar between the case where the number of elastic protrusions is a multiple of the number of stop protrusions and the case which it is not, the precision with which the nut is tightened are greatly different.

The stop protrusions are provided on the surface of the nut that comes into contact with the washer 300 and are arranged in a circumferential direction at positions spaced apart from each other at regular intervals. The stop protrusions, along with the elastic protrusions, function to prevent the nut from becoming loose.

Figure 4:
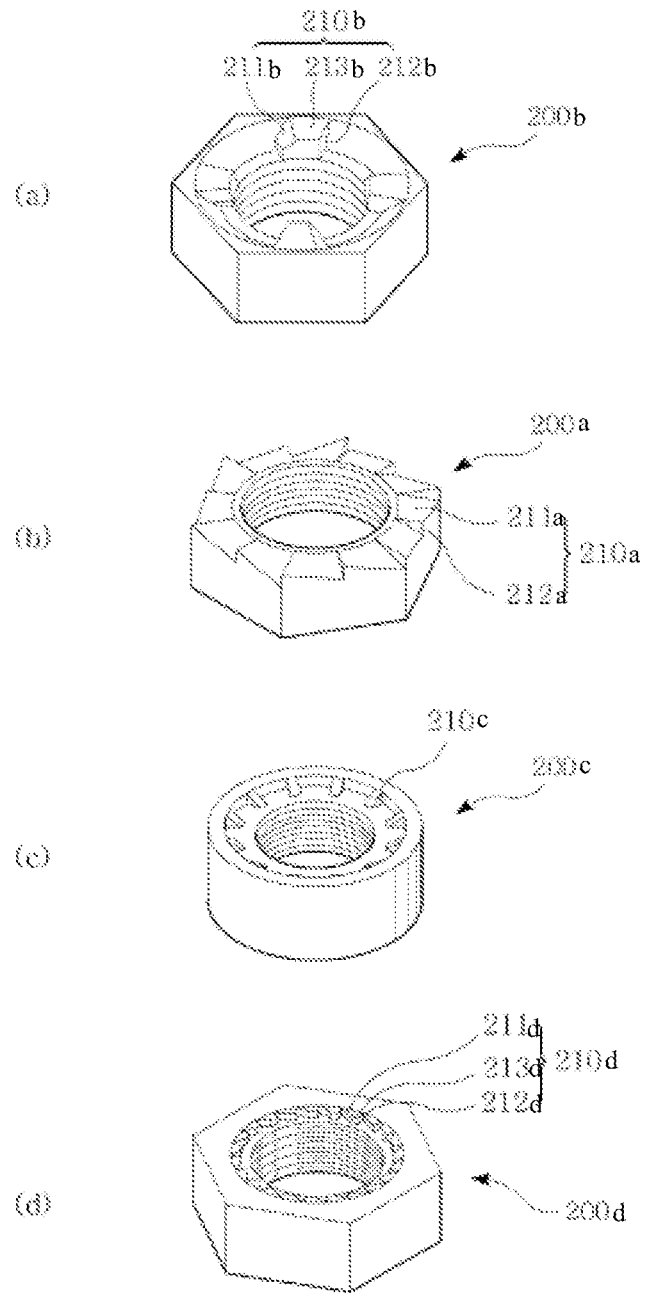
FIG. 4 shows embodiments of a nut (200a, 200b, 200c, 200d) which is one of elements of the present invention.

As shown in FIG. 4, the nut 200a, 200b, 200c, 200d can be embodied in a variety of shapes. Generally, as shown in FIG. 4a or 4b, a ramp 211a, 211b is formed on the first surface of each stop protrusion 210a, 210b over which the elastic protrusions pass, and a stop surface 212a, 212b is formed on the second surface of each stop protrusion 210 to which the corresponding elastic protrusion is locked. In the case where the elastic protrusions of the washer have the ramp pieces, the ramps 211a, 211b are not necessarily formed on the first surfaces of the stop protrusions 210a, 210b, because the elastic protrusions can easily pass over the first surfaces of the stop protrusions 210a, 210b due to the inclined angle of each ramp piece even though the ramps 211a, 211b are not formed on the first surfaces of the stop protrusions 211a, 211b.

As shown in FIG. 4b, the stop surface 212a may directly extend from the end of the ramp 211a or, alternatively, as shown in FIG. 4a, the stop surface 212a may extend from an end of a horizontal surface which has a predetermined length and extends from the end of the ramp 211a.

Furthermore, the stop protrusions 210a may be arranged at positions spaced apart from each other at regular intervals or, alternatively, they may be successively arranged.

In addition, as shown in FIG. 4c or 4d, the stop protrusions 210c, 210d may be configured in such a way that a counterbore is formed in the nut 200c, 200d and the stop protrusions 210c, 210d are formed on a circumferential inner surface of the counterbored portion of the nut 210c, 210d. In this case, if the saw-teeth of the elastic protrusions are bent in twist shapes and are inclined in the direction in which the nut 210c, 210d is turned to tighten it, although the ends of the saw-teeth are oriented parallel to the longitudinal direction of the bolt body, the locking function can be realized.

In the case of FIG. 4c, although the nut 200c is illustrated as having a circular periphery, the periphery of the nut 200c is not limited to a circular shape but may have a polyhedral shape, for example, a hexagonal shape, in the same manner as that of the nuts 200c of other embodiments.

Figure 6:
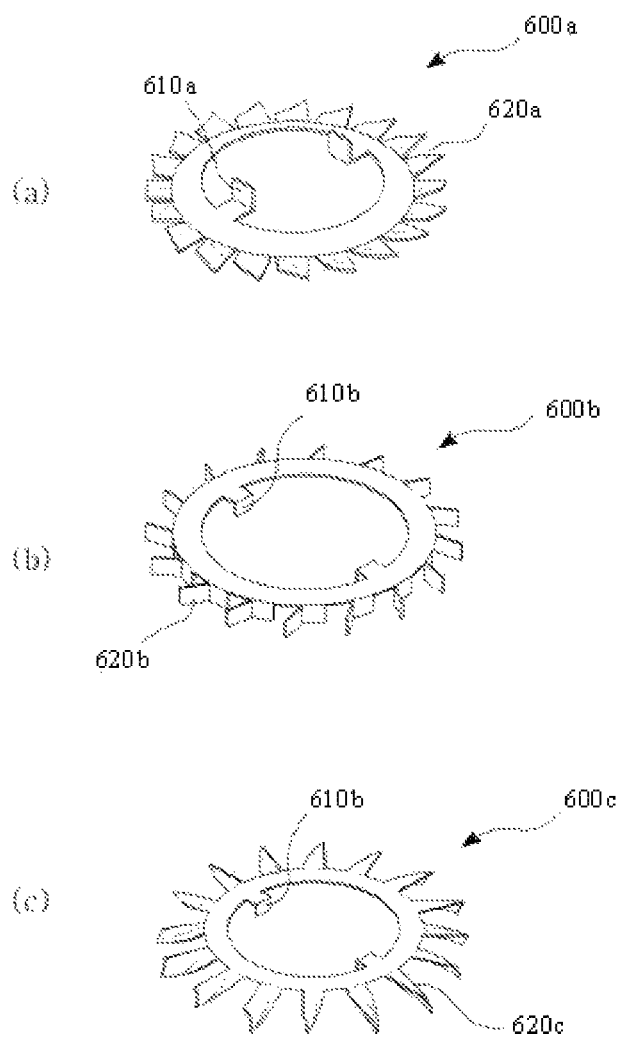
FIG. 6 shows other embodiments of the washer (600a, 600b, 600c) according to the present invention.
Figure 7:
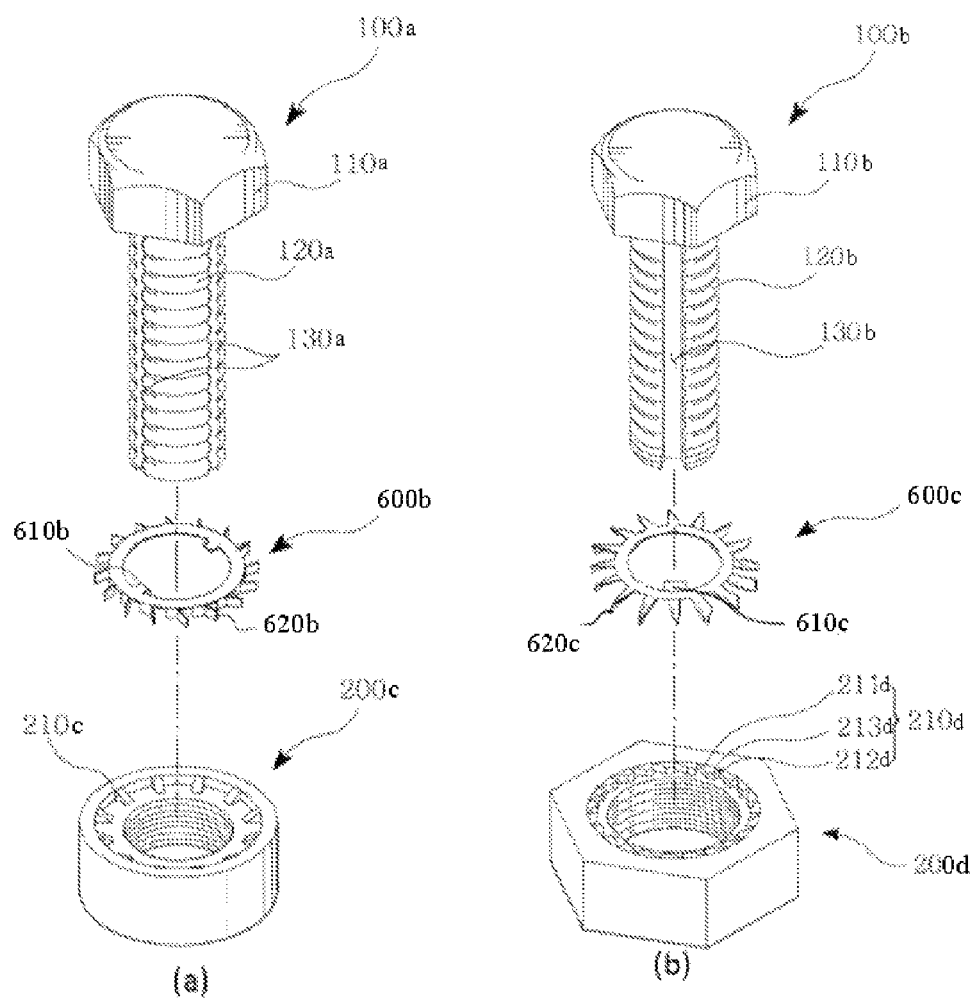
FIGS. 7a and 7b are perspective views of FIG. 4 and FIG. 6 showing a preferred embodiment of the present invention.

FIG. 6 illustrates other preferred embodiments of the washer 600a, 600b, 600c. FIGS. 6a and 6c show the cases where elastic protrusions 620a, 620c are twisted at a predetermined pitch angle towards the nut in a shape similar to that of a propeller. FIG. 6b shows the case where ramps pieces 620b are provided at regular intervals. Each washer 600a, 600b, 600c shown in FIG. 6 can be used with the nut which includes, as shown in FIG. 4c or 4d, the counterbored portion and the stop protrusions which are provided on the circumferential inner surface of the counterbored portion.

Although the preferred embodiments of the present invention have been disclosed for illustrative purposes, those skilled in the art will appreciate that the bounds of the present invention are limited to these embodiments, and various design modifications, additions or substitutions of well known techniques, simple variation of measurements, all changes in shapes of elements that can be easily conducted by those skilled in the art, etc. are possible, without departing from the scope and spirit of the invention as disclosed in the accompanying claims.

The technical effects of the present invention having the above-mentioned construction are as follows.

First, a nut can be more smoothly tightened by the elastic force of a washer. After the tightening has been accomplished, the washer which is biased to be returned to its original state is elastically locked to the nut, so that the nut is prevented from becoming loose as a result of vibrations or external force.

Second, even if the nut is slightly loosened or is partially damaged after the tightening has been accomplished, the washer which has been in contact with the nut can reliably continuously exhibit the self-locking function.

Third, because the washer is made of thin plate, when a user rotates the nut to intentionally loosen the nut, the washer is more easily broken than other elements, thus allowing the nut to be loosened. The nut can be tightened to the bolt again with the self-locking function by replacing only the washer which is expendable with a new one.

Fourth, the tightening torque with which the nut is tightened can be more precisely controlled and uniformly maintained.

The invention claimed is:

1. A self-locking bolt-nut assembly, comprising:
a bolt;
a nut having a hole to accommodate the bolt; and
a washer provided between the bolt and the nut,
wherein the bolt comprises a bolt head and a bolt body, the bolt body having an external thread thereon, with at least one insertion guide groove formed in the bolt body along the longitudinal direction of the bolt body,
wherein the nut has a counterbore that is recessed from a top surface of the nut around the hole and has an inner surface of a circumferential side wall and a bottom surface extending from the inner surface of the circumferential side wall to the hole, and the nut has a plurality of stop protrusions protruded from the inner surface of the circumferential sidewall toward the hole and ended at mid portions of the bottom surface before reaching the hole, the stop protrusions being arranged in a circumferential direction at regular intervals,
wherein at least part of the washer is accommodated in the counterbore of the nut,
wherein the washer comprises:
a main body having a ring shape;
at least one rotation-preventive protrusion protruded on inner circumference of the main body towards a center of the washer, the rotation-preventive protrusion being inserted into the insertion guide groove;
and a plurality of elastic protrusions protruded on outer circumference of the main body and inclined in the direction where the nut is turned to tighten it,
whereby when the nut which has been in contact with the washer is tightened, the elastic protrusions are elastically bent while passing over first surfaces of corresponding stop protrusions, and then are returned to original states thereof by elastic force so that elastic protrusions are locked to second surfaces of the stop protrusions,
wherein the elastic protrusions of the washer are twisted at a predetermined pitch angle with respect to the main body.

2. The self-locking bolt-nut assembly according to claim 1, wherein the elastic protrusions of the washer comprise ramp pieces arranged at positions spaced apart from each other at regular intervals, each of the ramp pieces being inclined in a direction in which the nut is rotated to be tightened.

3. The self-locking bolt-nut assembly according to claim 2, wherein when the number of stop protrusions is N and the number of elastic protrusions is M, an equation of M=n*N±1 (where n is a positive integer) is satisfied.

4. The self-locking bolt-nut assembly according to claim 1, wherein each of the stop protrusions of the nut has a ramp on the first surface thereof over which the elastic protrusions pass, and has a stop surface on the second surface thereof to which the corresponding elastic protrusion is locked.

5. The self-locking bolt-nut assembly according to claim 4, wherein when the number of stop protrusions is N and the number of elastic protrusions is M, an equation of M=n*N±1 (where n is a positive integer) is satisfied.

6. The self-locking bolt-nut assembly according to claim 1, wherein when the number of stop protrusions is N and the number of elastic protrusions is M, an equation of M=n*N±1 (where n is a positive integer) is satisfied.

7. The self-locking bolt-nut assembly according to claim 1, wherein the elastic protrusions of the washer respectively have height in a vertical direction to a plane of the main body and width in a parallel direction to the plane of the main body and wherein the height of the elastic protrusions is greater than the width of the elastic protrusions.

* * * * *